United States Patent [19]

Carmeli

[11] Patent Number: 5,742,434
[45] Date of Patent: Apr. 21, 1998

[54] ADAPTER FOR EXTRACTING A PORTION OF AN IMAGE FROM AN OPTICAL SYSTEM OR DEVICE

[75] Inventor: Ran Carmeli, Petach Tiqva, Israel

[73] Assignee: Vectop Ltd., Rosh Ha'ayin, Israel

[21] Appl. No.: 754,812

[22] Filed: Nov. 21, 1996

[30] Foreign Application Priority Data

Nov. 24, 1995 [IL] Israel ............................ 116131

[51] Int. Cl.$^6$ .................................................. G02B 27/14
[52] U.S. Cl. ....................................... 359/629; 359/640
[58] Field of Search .................................. 359/629, 634, 359/638, 639, 640

[56] References Cited

U.S. PATENT DOCUMENTS

| | | | |
|---|---|---|---|
| 4,272,161 | 6/1981 | Feinbloom | 350/320 |
| 4,344,667 | 8/1982 | Wooff, Jr. | 350/80 |
| 4,407,272 | 10/1983 | Yamaguchi | 128/6 |
| 4,518,230 | 5/1985 | Weber | 350/511 |
| 4,629,295 | 12/1986 | Vogl | |
| 4,818,065 | 4/1989 | Ziph et al. | |
| 4,903,133 | 2/1990 | Hiltebrandt | 358/225 |
| 4,905,082 | 2/1990 | Nichigaki et al. | 358/98 |
| 5,239,984 | 8/1993 | Cane et al. | 128/9 |
| 5,341,242 | 8/1994 | Gilboa et al. | |
| 5,450,144 | 9/1995 | Ben Nun | 351/219 |
| 5,599,276 | 2/1997 | Hauptli et al. | 351/206 |

*Primary Examiner*—David C. Nelms
*Assistant Examiner*—Thomas Robbins
*Attorney, Agent, or Firm*—Browdy and Neimark

[57] ABSTRACT

An adapter for an optical eyepiece for propagating a non-collimated light beam from an object along an optical axis of the eyepiece so as to present an image to an observer, the adapter comprising a beam splitter for inserting into the eyepiece so as to intercept the light beam and direct a portion thereof outside the eyepiece through an exit aperture of the beam splitter without substantially changing the image to the observer. The adapter is particularly useful for extracting a portion of an image from an eyepiece having restricted access in a night vision goggles thus permitting an external scene to be recorded simultaneous with its being viewed by the observer.

19 Claims, 6 Drawing Sheets

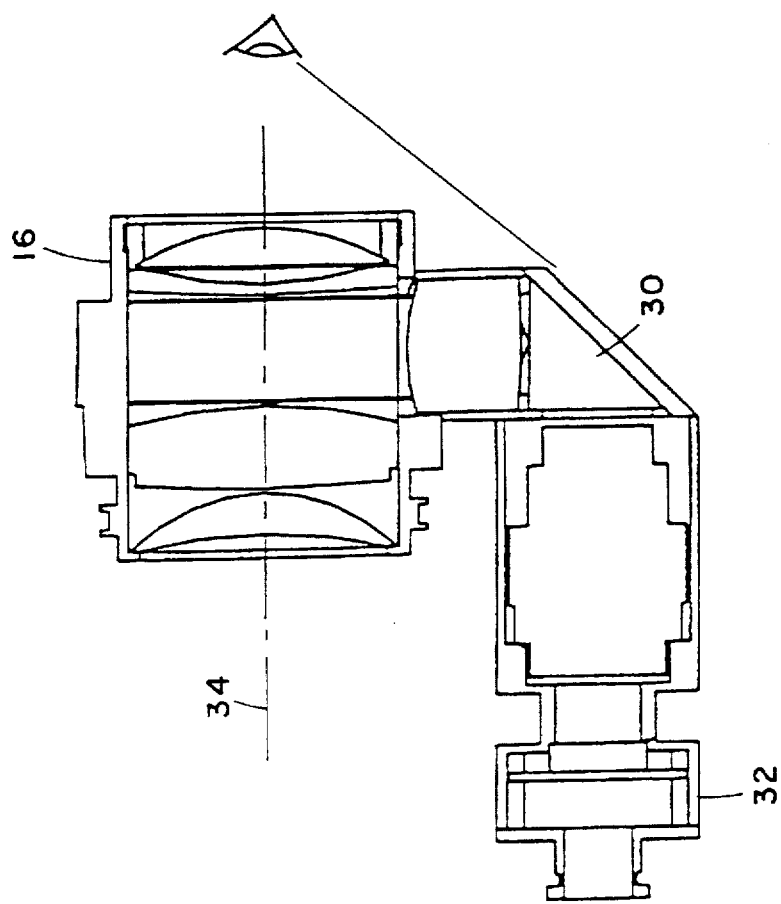
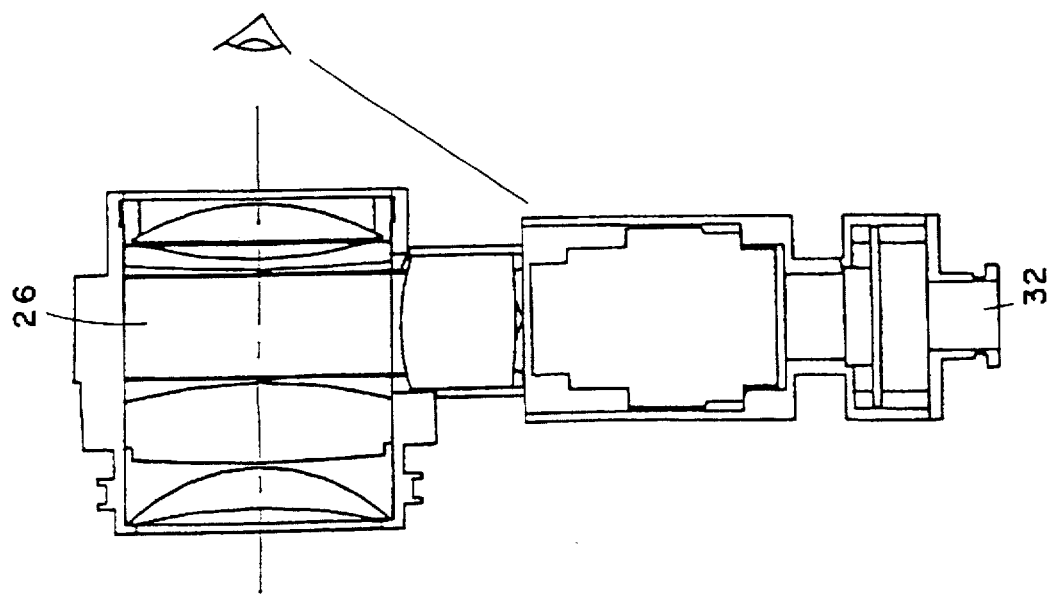

ADAPTER FOR EXTRACTING A PORTION OF AN IMAGE FROM AN OPTICAL SYSTEM OR DEVICE

FIELD OF THE INVENTION

This invention relates in general to optical beam splitters and, more particularly, to an adapter for mounting in an optical eyepiece for extracting a portion of an image produced thereby.

BACKGROUND OF THE INVENTION

It is sometimes required to monitor an optical image which is viewed through an eyepiece by an observer so that other interested parties external to the observer can see the exact image seen by the observer. This requirement has been addressed in the prior art so as to permit, for example, a pilot's field of view to be captured and then relayed as a video image either to an external party or, after suitable processing, back to the pilot himself.

Such systems are commonly mounted on, or in conjunction with, a pilot's head up display and typically employ a miniature CCD TV camera mounted either on the head up display or to a visor thereof. For example, U.S. Pat. No. 5,341,242 to Gilboa et al discloses an optical projector which projects an image on to the semi-transparent portion for reflection from it. The semi-transparent portion has a relatively higher reflectivity in a central area and a relatively lower reflectivity in an annular area outside the central area. In accordance with one embodiment, the head mounted display includes a projector having a display source where an image is formed. An optical system for focusing the image at separate sagittal and tangential foci is provided between the image-forming surface and the semi-transparent portion. Such an arrangement may be employed in a visor attached to a pilot's helmet, such that the visor has a partially reflecting semi-transparent portion in view of the pilot.

In the system described by Gilboa et al and in all similar systems, the projected image is collimated so that the physical location of the projector relative to the visor is unimportant.

It is also known to syphon off a portion of a telescope image beam using a beam splitter so that the image can be presented to an external observer. Here again, the image beam is collimated so that the beam splitter can be disposed anywhere in the optical path of the image beam in order to achieve the required effect.

FIG. 1a shows a prior art night vision instrument 1 with electronic image converter as disclosed in U.S. Pat. No. 4,629,295 (Vogl) and comprising an image intensifier tube 2 or a similar device. The night vision instrument disclosed by Vogl may be located beside an ordinary telescope eyepiece 3 or TV camera 4 so as to enable the telescope eyepiece or TV camera to be used during night time. A light gathering objective lens 5 having therein a concave mirror 6 for imaging light rays from a scene towards an entrance surface of the image intensifier tube 2 and an opposite exit surface for directing an intensified image via a first reflecting surface 7 through a collimator 8 and a second reflecting surface 9 towards the telescope eyepiece 3. The second reflecting surface 9 may, if desired, be a beam splitter so as to direct a part of the intensified image towards the eyepiece whilst allowing transmission of a portion of the intensified beam through the beam splitter towards the television camera 4 mounted outside the objective 5.

It is thus to be noticed that, in the device proposed by Vogl, an external television camera may be effectively coupled, via a beam splitter, to an objective lens. Further, since the intensified image beam is directed through a collimator towards the beam splitter, the beam splitter sees a collimated beam suitable for viewing by a conventional infinite conjugate. Thus, in particular, it is to be noted that the arrangement disclosed by Vogl allows for the beam splitter 9 to intercept a collimated beam and allows the beam splitter 9 to be disposed in conjunction with an objective lens 5 so as to couple the intensified image beam produced thereby to an eyepiece 3. There is also disclosed the possibility of allowing the beam splitter 9 to direct a daylight image of a scene directly to the telescope eyepiece 3 at the same time as the intensified night vision is directed thereto via the objective lens 5. However, even in this case, the beam splitter 9 directs a conventional collimated beam to the eyepiece 3. Moreover, since the beam splitter 9 is disposed outside of the eyepiece 3 and, in fact, outside of the objective lens 5 also, there are no limiting constraints on the physical separation of the beam splitter from either of these elements apart, of course, from the obvious requirement to avoid rendering the device unduly bulky.

U.S. Pat. No. 4,818,065 (Ziph) discloses an optical device particularly useful as a night vision goggles including an objective lens which is located remote from the viewer's eye for viewing a scene, and a cathode ray tube and prism assembly for injecting additional information into the viewed scene. Since the objective lens is located remote from the user's eye, the incoming light must be near collimated. By thus disposing a prism assembly in close proximity to the objective lens itself, there may be injected into the optical path extraneous information without the prism assembly itself being registered since the depth of view of the objective lens is insufficiently broad to allow simultaneous focussing (i.e. registration) of a remote image together with prism assembly. By such means, the desired combination of the two images may be effected without significantly impairing the quality of the image.

Common to all such systems is that they employ an infinite conjugate which forms a collimated virtual image of a distant object. However, optical systems are also known which form a real image on a screen close to the eyes of the observer, and in such systems the image beam does not emanate from infinity and so is not collimated. Furthermore, such systems are usually compact, and it is therefore inherently more difficult to intercept the image beam so as to syphon off a portion thereof.

One system which produces a real image of a distant object is a pair of Night Vision Goggles. Such goggles comprise, for each eye of the observer, an objective lens for imaging a distant object so as to form an image beam and an image intensifier tube which intercepts the image beam, converts the light to electrons and then amplifies the number of electrons. A phosphor captures the electrons so as to generate an amplified image which is viewed by an observer through a suitable eyepiece mounted proximate the image intensifier tube so that the phosphor is in the focal plane of the eyepiece.

Night vision goggles are compact and it is difficult both physically and optically to capture the image for several reasons. First, there is little point in intercepting the collimated image formed by the objective lens because the image formed thereby is too weak and would itself require image intensification to be usable by an external observer. This means that only the eyepiece image can be intercepted. However, syphoning off a portion of the eyepiece beam inevitably reduces the intensity of the beam which passes to the eye of the observer. At night the image beam intensity is weak in any case, and so the extent to which it may be further reduced is obviously limited. Additionally, owing to the compactness of the eyepiece, it is difficult to insert a beam splitter therein, particularly if optical distortions are to be avoided or at least compensated for.

Yet another consideration is that because space within the eyepiece is invariably at a premium, a beam splitter, for example, disposed therein in order to extract a portion of the eyepiece beam must be asymmetrical in order to maximize transmission of light through the eyepiece whilst still allowing a portion thereof to be extracted without diminishing the field of view. Eyepieces of the kind generally used in night vision systems are generally provided with a wide angle so as to provide an increase field of view. Wide angle coverage is usually accomplished by providing several optical elements any pair of which are necessarily close to each other. It is into the limited space between these optical elements that any beam splitter must be disposed in order to extract a portion of the eyepiece image. If, for example, the aperture of the lens is in the order of 30 mm whilst the space between the optical elements is in the order of 10 mm, then a symmetrical beam splitter having equal dimensions in the order of 10 mm disposed symmetrically in the light path of the eyepiece, would intercept incoming light only within a 5 mm radius of the optical axis and there would be an annular portion having a width of 10 mm surrounding the beam splitter where light would pass directly through the eyepiece without passing through the beam splitter. This is unacceptable because it would introduce severe optical distortions in the eyepiece which would be most difficult to correct. Equally, it is unacceptable to block out the surrounding annular portion since this would drastically reduce both the field of view and the quantity of light passing through the eyepiece and is therefore obviously unacceptable during night time vision when, in any case, the quantity of light is limited. These considerations dictate the use of an asymmetric beam splitter which is, of course, distinguished from prior art designs of the kind discussed where, to the extent that beam splitters are used at all, they are invariably symmetrical.

Further, if the reason for intercepting a portion of the eyepiece image is to direct the image to an external observer, then in order to do so in such a manner than the optical system remains compact, the image must be converted to standard video format by means of a miniature TV camera and an associated video processor. The latter can, of course, be mounted remote from the eyepiece but the camera must be mounted in very close proximity thereto so as to focus the image syphoned off by the beam splitter and this means, in practice, that it must be mounted proximate an exit aperture of the beam splitter and optically coupled thereto. This must obviously be done whilst allowing for the video signal to be fed to a remote location and for electrical power to be fed to the video camera without adding too much bulk to the night vision goggles.

SUMMARY OF THE INVENTION

It is a principal object of the invention to provide a beam splitter in a finite conjugate which propagates a non-collimated image beam.

According to a broad aspect of the invention there is provided an adapter for an optical eyepiece for propagating a non-collimated light beam from an object along an optical axis of the eyepiece so as to present an image to an observer, said adapter comprising a beam splitter for inserting into the eyepiece so as to intercept the light beam and direct a portion thereof outside the eyepiece through an exit aperture of the beam splitter without substantially changing said image to the observer.

Preferably, the adapter further includes optical correction means for correcting for optical distortions produced consequent to inserting the beam splitter into the eyepiece, a collimating lens disposed proximate the exit aperture of the beam splitter for collimating said portion of the light beam so as to produce a collimated exit beam, and optical folding means for intercepting the exit beam and folding the collimated exit beam through 90° so as to produce a folded exit beam.

In such an adapter, the exit beam is parallel to the optical axis of the eyepiece and allows for the adapter to add minimal additional bulk to the eyepiece. This is of particular importance in optical systems which are designed to be portable and compact, such as Night Vision Goggles.

In accordance with a preferred embodiment of the invention, there is provided an optical system comprising:

a Night Vision Goggles having mounted in at least one eyepiece thereof an adapter comprising a beam splitter for inserting into the eyepiece so as to intercept the light beam and direct a portion thereof outside the eyepiece through an exit aperture of the beam splitter, optical correction means associated with the beam splitter for correcting for optical distortions produced consequent to inserting the beam splitter into the eyepiece, a collimating lens disposed proximate the exit aperture of the beam splitter for collimating said position of the light beam so as to produce a collimated exit beam, optical folding means for intercepting the exit beam and folding the collimated exit beam through 90° so as to produce a folded exit beam, an imaging lens for intercepting the folded exit beam and producing a focussed image, and a video camera mounted in a focal plane of the imaging lens for capturing said image and producing a corresponding video signal.

BRIEF DESCRIPTION OF THE DRAWINGS

In order to understand the invention and to see how it may be carried out in practice, a preferred embodiment will now be described, by way of non-limiting example only, with regard to an adapter for inserting into at least one eyepiece of a Night Vision Goggles and with reference to the accompanying drawings, in which;

FIGS. 4a and 4b are pictorial representations of miniature cameras mounted beneath the eyepiece in a Night Vision Goggles and respectively parallel and normal thereto;

FIG. 6 is a schematic diagram of an optical system employing a modified Night Vision Goggles according to

DETAILED DESCRIPTION OF A PREFERRED EMBODIMENT

Figure 1A:
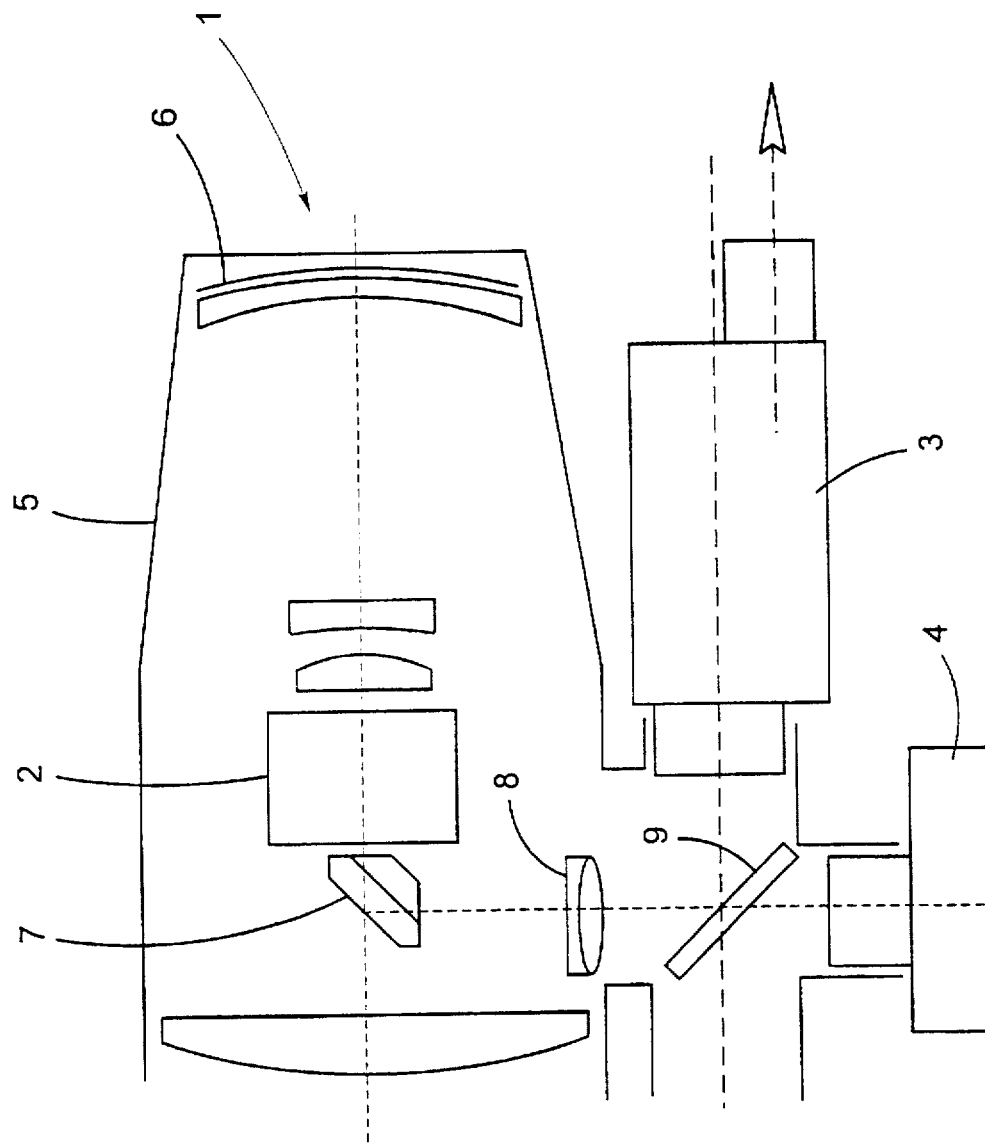
FIG. 1a is a schematic diagram showing an optical construction of a prior art Night Vision Goggles providing coincident day and night vision facility.
Figure 1B:
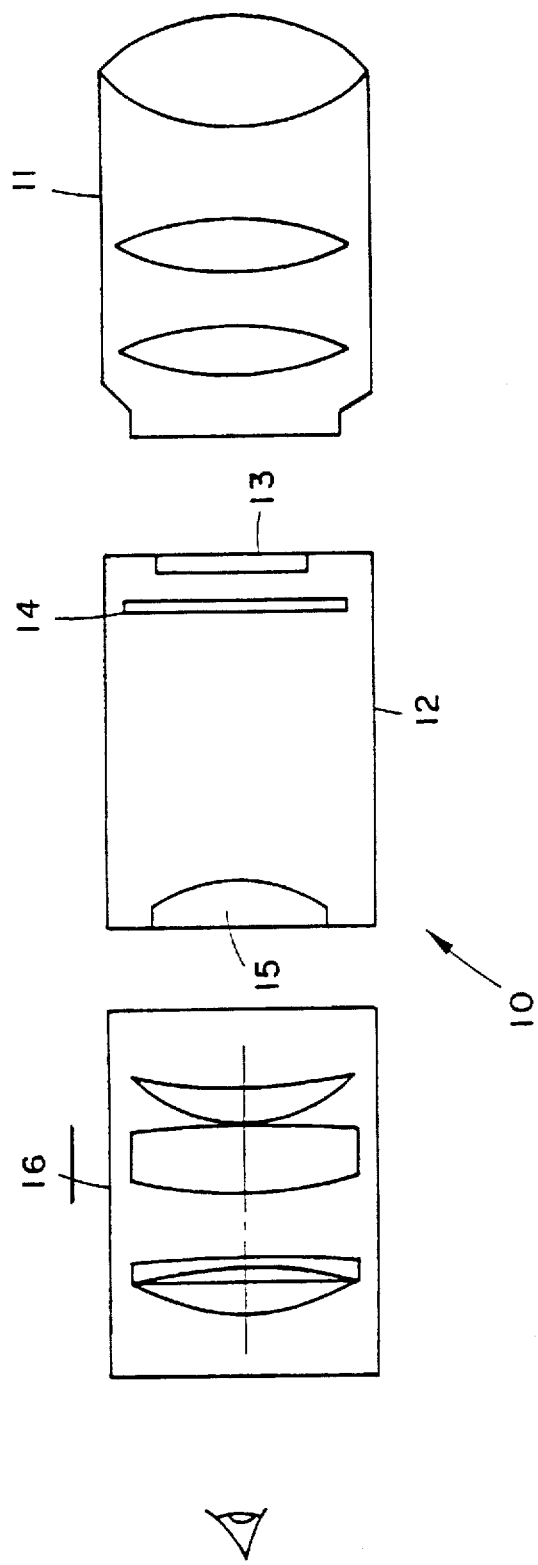
FIG. 1b is a schematic diagram showing an optical construction of a conventional Night Vision Goggles.

FIG. 1b is a schematic diagram showing an optical construction of a conventional Night Vision Goggles 10 comprising an infinite conjugate objective lens 11 for imaging a distant object so as to form an image beam (not shown) and an image intensifier tube 12 mounted proximate the objective 11. The image intensifier tube 12 includes a photo-cathode 13 typically formed of gallium arsenide for convening the image beam to electrons, and a micro channel plate 14 which receives and amplifies the number of electrons. A phosphor 15 captures the electrons so as to generate an amplified image which is viewed by an observer through a suitable eyepiece 16 mounted proximate the image intensifier tube 12 so that the phosphor 15 is in the focal plane of the eyepiece 16. As shown the eyepiece 16 includes a housing 17 containing a rear lens 18, an intermediate lens 19 and a front lens 20 although this may well vary according to design. The front lens 20 is mounted at a front of the housing 17 and the rear lens 18 is mounted towards a rear of the housing 17 with the intermediate lens 19 adjacent the rear lens 18 and substantially in contact therewith. There thus remains a gap 21 between the intermediate lens 19 and the front lens 20.

Figure 2:
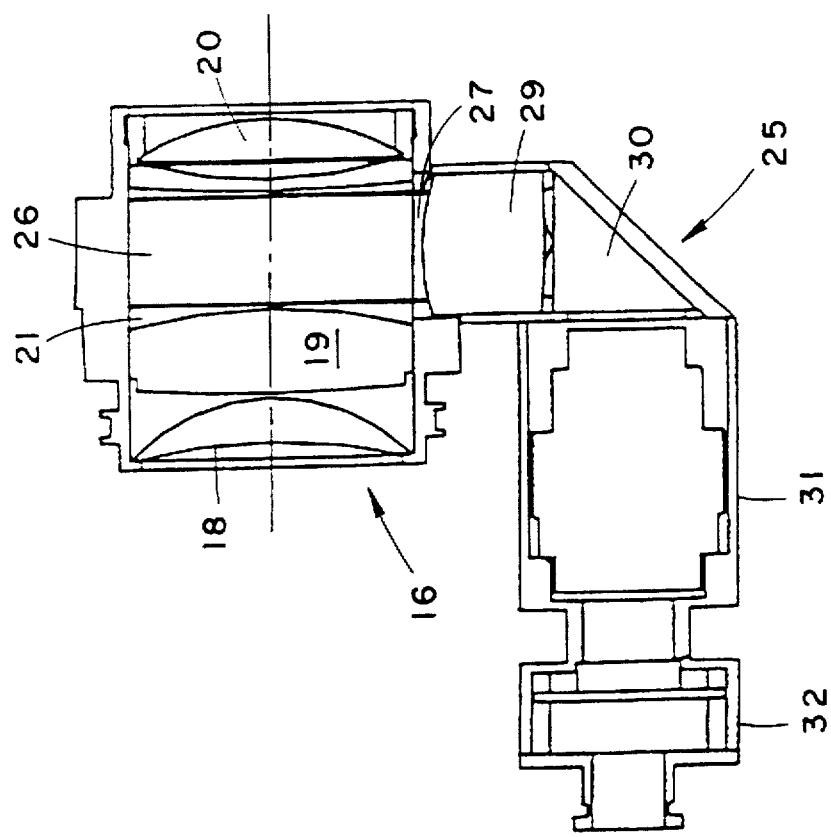
FIG. 2 is a schematic diagram of an optical construction of a modified eyepiece for use with the Night Vision Goggles shown in FIG. 1.

FIG. 2 is a schematic diagram of an optical construction of the eyepiece 16 having mounted therein an adapter depicted generally as 25 for allowing a portion of the image beam to be syphoned off so as to be directed to an external observer. The adapter 25 includes a beam splitter 26 which is placed within the gap 21 between the intermediate lens 19 and the front lens 20 for intercepting a central portion only of the image beam and directing it out of the eyepiece 16 through an exit aperture 27 of the beam splitter 26. As a result approximately 30% of the intensity of the image beam is syphoned off through the exit aperture 27 of the beam splitter as an exit beam shown schematically as 28. The remaining 70% of the intensity of the image beam passes through the front lens 20 of the eyepiece 16 to the observer, and is sufficiently strong to be seen well even at night without noticeably detracting from the effectiveness of the Night Vision Goggles 10.

The beam splitter 26 includes baffles and is coated with a suitable anti-reflection (AR) coating so as to correct for optical distortions produced consequent to inserting the beam splitter 26 into the eyepiece 16. The design of the baffles and the AR coating, both of which constitute optical connection means, is not itself a feature of the invention and is well within the scope of an optical engineer.

Optical distortions caused by the insertion of the beam splitter 26 into the eyepiece 16 may also be compensated for by replacing or modifying at least part of the existing (original) elements in the eyepiece 16. This may require, for example, that the radii of curvature of the existing optical elements in the eyepiece 16 be modified or that their mutual separation be changed so as to introduce distortions which exactly counter-balance those distortions caused by the introduction of the beam splitter 26. Likewise, the beam splitter 26 may be provided with at least one non-planar surface so as to produce distortions which, again, counter-balance those caused by its introduction into the eyepiece 16. Computer simulator programs are typically used to model optical lenses and to allow for their optimization consequent to specified optical criteria and these programs are well within the competence of an optical engineer without requiring a full description for a proper understanding of the invention.

Mounted proximate the exit aperture 27 of the beam splitter 26 is a collimating lens 29 which collimates the exit beam 28 so as to direct a substantially parallel beam to a 45° folding prism 30 which folds the collimated exit beam through 90° so that it is parallel to the optical axis of the eyepiece 16. An imaging lens designated schematically as 31 is mounted proximate the folding prism 30 so as to focus the folded beam on to a miniature CCD TV camera 32.

Figure 3:
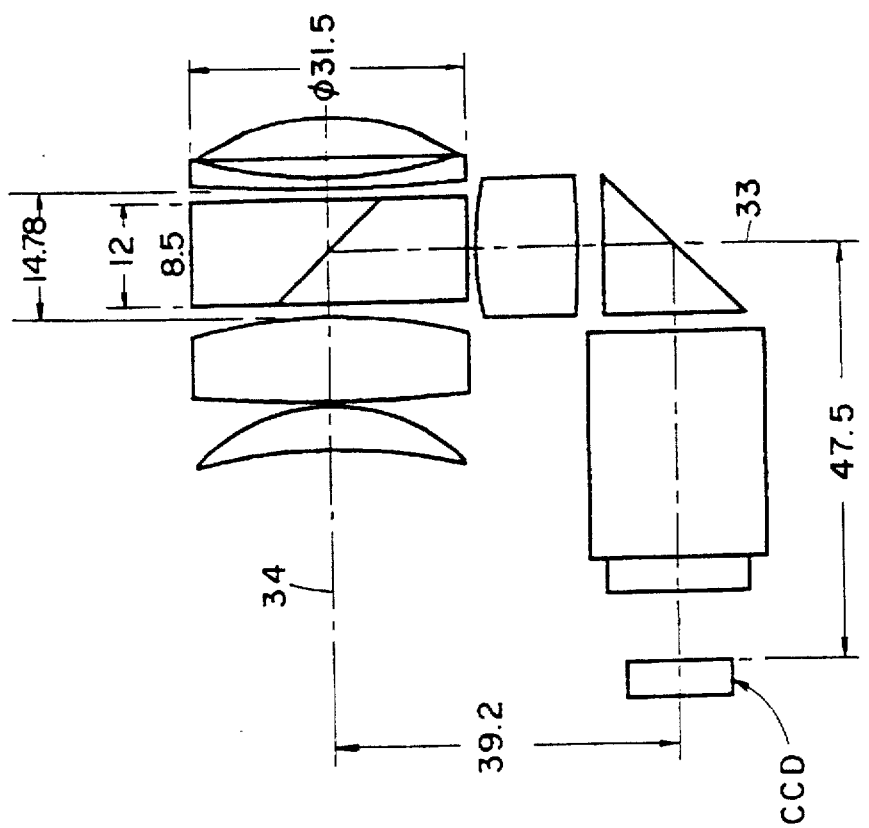
FIG. 3 is a schematic diagram shown in FIG. 2 indicating dimensions of the optical construction thereof according to one embodiment of the invention.

FIG. 3 shows schematically the modified eyepiece 16 bearing typical dimensions in mm. Thus the front lens 20 has a diameter of 31.5 mm and the gap 21 has a width of 14.78 mm. The beam splitter 26 has a diameter of 12 mm and an optical axis 33 which is displaced from the CCD TV camera 32 by a distance of 47.5 mm. The eyepiece 16 has an optical axis 34 which is displaced a distance of 39.2 mm from the optical axis of the CCD TV camera 32. It will also be noted that the optical arrangement of the modified eyepiece is completely symmetrical about its optical axis 34. This permits rotation of the beam splitter 26 about the optical axis 34 without affecting in any way its optical performance and this, in turn, allows the CCD TV camera 32 to be located above or below the Night Vision Goggles 10 or to one side thereof, as required.

From a consideration of the construction shown in FIG. 3 and the dimensions therein, several advantages of the construction according to the invention emerge. First, very little bulk is added to the conventional Night Vision Goggles 10 shown schematically in FIG. 1b. Secondly, since the image beam within the eyepiece is folded twice: once by the beam splitter 26 and again by the folding prism 30, the resulting folded image beam is not inverted and so the image directed to the external observer is upright. Additionally, as explained above, rotation of the adapter 25 with respect to the eyepiece 16 adds to the convenience of the arrangement, whilst as will now be explained not unduly impairing the observer's download field of view even if the CCD TV camera 32 is mounted below the eyepiece 16.

FIGS. 4a and 4b show schematically a detail of the optical arrangement depicted in FIG. 3 with and without the folding prism 30, respectively. In FIG. 4a, the absence of the folding prism 30 dictates that the CCD TV camera 32 is normal to the optical axis 34 of the eyepiece. The arrangement is inevitably bulkier and the CCD TV camera 32 obscures the downward field of view of the observer. Further, since the image beam is inverted once only (by the beam splitter 26) the external observer sees an inverted image.

However, when the folding prism 30 is employed, the CCD TV camera 32 is parallel to the optical axis 34 of the eyepiece 16 resulting in a much more compact arrangement and, for the reasons set out above, ensure that the image seen by the external observer is not inverted. Moreover, the downward field of view of the observer is not impaired.

Figure 5:
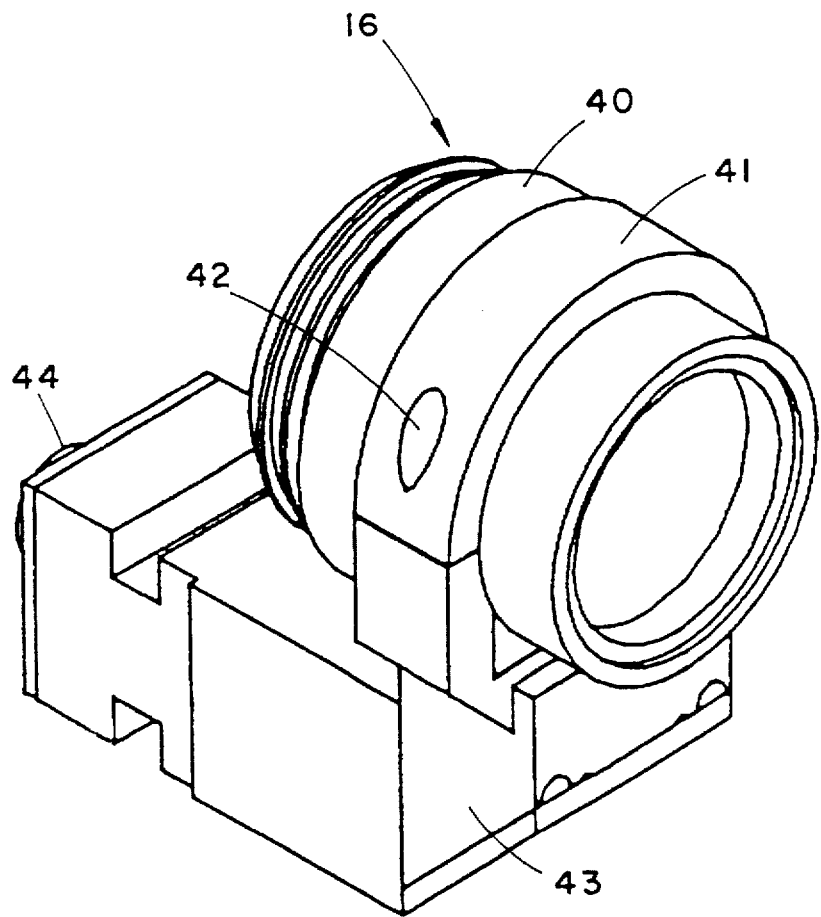
FIG. 5 is a perspective view of the modified eyepiece shown in FIG. 2.

FIG. 5 shows in perspective a view of the modified eyepiece 16 having a housing 40 and an annular adjustment 41 fixedly coupled to the beam splitter 26 and rotatable relative to the housing 40, so as to rotate the exit aperture 27 of the beam splitter 26. A pair of locking screws 42, of which one only is shown in the figure, allows for the beam splitter 26 to be fixed relative to the housing 40 so that it cannot be inadvertently rotated. Fixedly mounted with respect to the exit aperture 27 of the beam splitter 26 is a housing 43 for accommodating therein the collimating lens 29, the imaging lens 31 and a mount 44 for fixing thereto the CCD TV camera 32.

Figure 6:
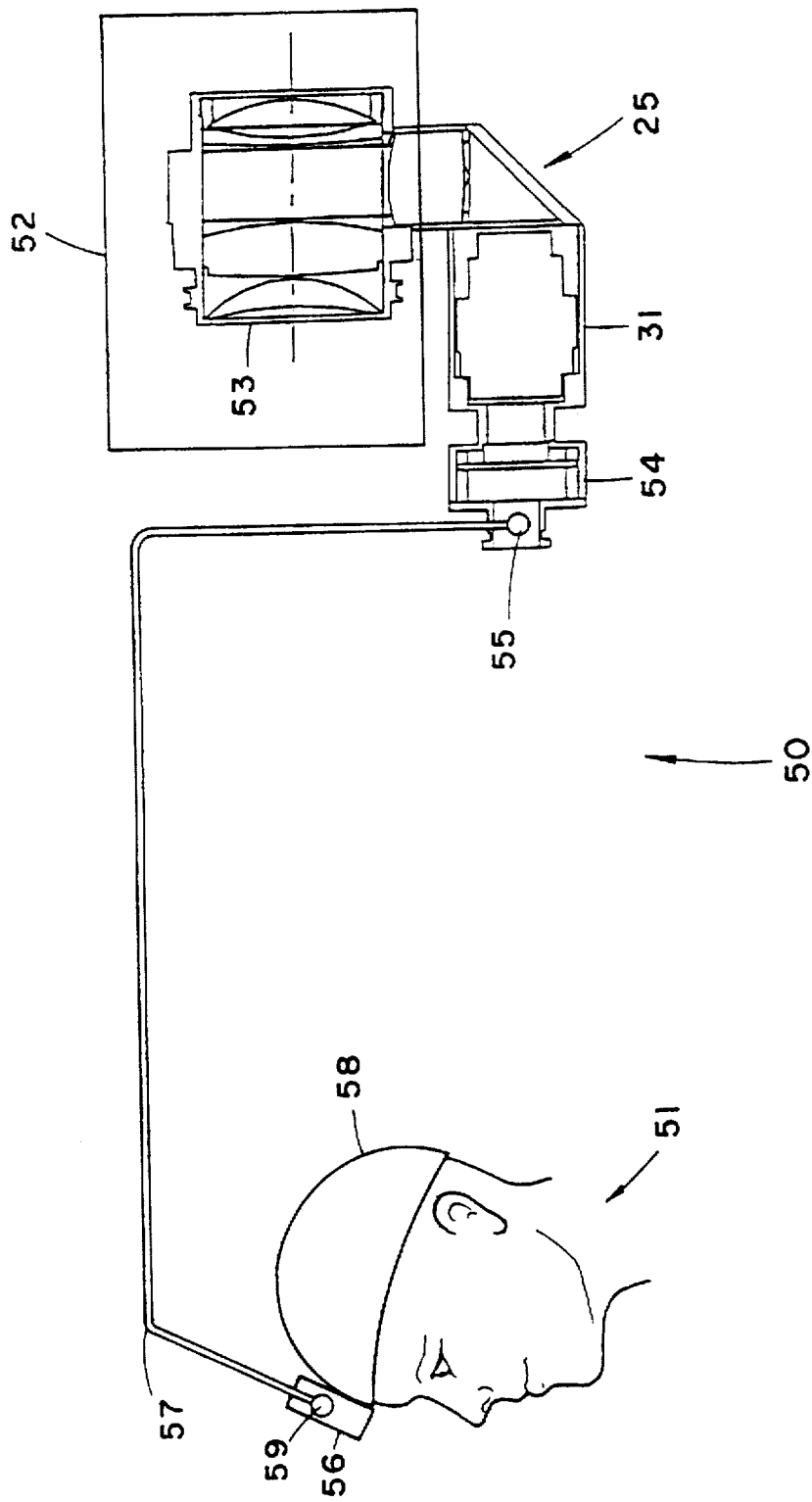

FIG. 6 is a schematic diagram of an optical system 50 employing the modified Night Vision Goggles according to the invention for directing an image produced thereby to an external observer 51.

The system 50 comprises a Night Vision Goggles 52 having mounted in at least one eyepiece 53 thereof the adapter 25 as described in detail above with reference to FIG. 5 of the drawings. A miniature CCD TV camera 54 is fixed to the mount 44 of the adapter 25 so that a focal plane of the camera 54 is coplanar with the focal plane of the imaging lens 31 whereby the camera 54 captures the focussed image and produces a corresponding video signal.

The camera 54 is provided with a socket 55 (constituting a video coupling means) for coupling thereto a video processor 56 (constituting a video processing means) which is responsive to the video signal for generating a standard video image signal conforming to a predetermined standard video format. The socket 55 includes both video and electrical power connections and is coupled to the video processor 56 by means of a multi-core cable 57 which includes both video and power cores thus enabling electrical power to be supplied to the camera 54 and the video signal generated by the camera 54 to be received using the same cable.

The external observer 51 wears a helmet shown schematically as 58 having mounted on both sides thereof a matching socket 59 for coupling the cable 57 thereto so that electrical power can be fed to appropriate connections in the socket 59 so as to provide electrical supply to the camera 54 and, at the same time, allow for extraction of the camera video signal for feeding to the video processor 56. The socket 59 thus constitutes a video and power supply coupling means which, because only a single cable connection to both coupling means is required, allows for quick connection and release. Furthermore, by providing paired sockets 59 on opposite sides of the helmet 58, the cable 57 may be connected to either side of the helmet 58, thus making the connection and release equally convenient for both right and left handed personnel.

It is to be noted that the invention contemplates within its scope a Night Vision Goggles adapted for stereoscopic use and a system for use therewith by mounting a pair of adapters as described, one in each eyepiece of the Night Vision Goggles.

It will be appreciated that the dimensions of the eyepiece shown in FIG. 3 are by way of example only. In practice, different eyepieces must be customized for mounting therein the adapter, but the customization is not itself a feature of the invention and is well within the scope of an optical engineer. It is also to be noted that not all eyepieces lend themselves to adaptation. In this case, the adapter may be mounted in a suitable eyepiece which is then substituted for the original eyepiece of the Night Vision Goggles.

Finally, although the invention has been described with particular reference to an adapter for use with Night Vision Goggles, these are merely an example of an optical device having a finite conjugate. The principles of the invention are equally well suited to other such devices.

I claim:

1. An adapter for an optical eyepiece having a housing containing at least two optical elements for propagating a non-collimated light beam from an object along an optical axis of the eyepiece so as to present an image to an observer, said adapter comprising a beam splitter for inserting into the eyepiece between said at least two optical elements so as to intercept the light beam and direct a portion thereof outside the eyepiece through an exit aperture of the beam splitter without substantially changing said image to said observer.

2. The adapter according to claim 1, wherein the beam splitter is asymmetrical and is inserted into a restricted space between said at least two optical elements in the eyepiece so as to extract a portion of the light beam over a reduced field of view whilst not reducing a Field of View of the light beam passing through both of said optical elements in the eyepiece.

3. The adapter according to claim 2, further including optical correction means for correcting for optical distortions produced consequent to inserting the beam splitter into the eyepiece.

4. The adapter according to claim 2, further including:

a collimating lens disposed proximate the exit aperture of the beam splitter for collimating said portion of the light beam so as to produce a collimated exit beam, and optical folding means for intercepting the exit beam and folding the collimated exit beam through 90° so as to produce a folded exit beam.

5. The adapter according to claim 4, wherein the exit aperture of the beam splitter lies in a plane which is substantially parallel to the optical axis of the eyepiece so that the folded exit beam is substantially parallel to said optical axis.

6. The adapter according to any one of claim 5, wherein the exit aperture of the beam splitter is below the eyepiece and the video camera is so dimensioned as not substantially to obscure an observer's downward field of view.

7. The adapter according to claim 4, further including:

an imaging lens for intercepting the folded exit beam and producing a focussed image, and a video camera mounted in a focal plane of the imaging lens for capturing said image and producing a corresponding video signal.

8. The adapter according to claim 7, wherein the video camera is provided with a video coupling means for coupling a video processing means thereto which is responsive to the video signal for generating a standard video image signal conforming to a predetermined video format.

9. The adapter according to claim 7, wherein the video camera is a miniature CCD television camera.

10. The adapter according to claim 1, wherein the beam splitter is rotatably mounted with the eyepiece so as to permit rotation of the exit aperture of the beam splitter about the optical axis of the eyepiece.

11. The adapter according to claim 1, wherein the eyepiece is a component in a Night Vision Goggles.

12. An eyepiece having a housing containing therein the adapter according to claim 1.

13. An optical system including at least one eyepiece having coupled thereto the adapter according to claim 1.

14. The optical system according to claim 13, for producing a stereoscopic image which is directed away from the system, said optical system including two eyepieces each propagating a non-collimated light beam therein and each having coupled thereto an adapter comprising:

a beam splitter for inserting into the eyepiece so as to intercept the light beam and direct a portion thereof outside the eyepiece through an exit aperture of the beam splitter.

15. An optical system comprising:

a Night Vision Goggles having mounted in at least one eyepiece thereof an adapter comprising a beam splitter for inserting into the eyepiece so as to intercept a non-collimated light beam therein and direct a portion thereof outside the eyepiece through an exit aperture of the beam splitter.

optical correction means associated with the beam splitter for correcting for optical distortions produced consequent to inserting the beam splitter into the eyepiece, a collimating lens disposed proximate the exit aperture of the beam splitter for collimating said portion of the light beam so as to produce a collimated exit beam, optical folding means for intercepting the exit beam and folding the collimated exit beam through 90° so as to produce a folded exit beam, an image lens for intercepting the folded exit beam and producing a focussed image, and a video camera mounted in a focal plane of the imaging lens for capturing said image and producing a corresponding video signal.

16. The system according to claim 15, wherein the video camera is provided with a video coupling means for coupling a video processing means thereto which is responsive to the video signal for generating a standard video image signal conforming to a predetermined video format.

17. The system according to claim 16, wherein the video coupling means is coaxial with a power supply coupling means for providing electrical power to the video camera via a single cable having therein respective video signal and electrical supply cores.

18. The system according to claim 17, wherein the video and power supply coupling means are mounted on a helmet worn by the observer.

19. The system according to claim 18, wherein a pair of video and power supply coupling means are mounted on opposite sides of said helmet so as to allow said cable to be connected to either side of the helmet depending on whether the observer is right or left handed.

* * * * *